(12) United States Patent
Weng et al.

(10) Patent No.: US 9,219,295 B2
(45) Date of Patent: Dec. 22, 2015

(54) THERMOSTATIC ASSEMBLY FOR POWER MEMBERS OF AN ELECTRIC VEHICLE AND THE OPERATING PROCESS THEREOF

(75) Inventors: Kuo-Liang Weng, Lugang (TW); Po-Hsu Lin, Lugang (TW); Yen-Ting Cheng, Lugang (TW)

(73) Assignee: Automotive Research & Testing Center, Changhua County (TW)

( * ) Notice: Subject to any disclaimer, the term of this patent is extended or adjusted under 35 U.S.C. 154(b) by 760 days.

(21) Appl. No.: 13/621,239

(22) Filed: Sep. 15, 2012

(65) Prior Publication Data

US 2014/0076979 A1 Mar. 20, 2014

(51) Int. Cl.
| | |
|---|---|
| *G05D 23/19* | (2006.01) |
| *H01M 10/613* | (2014.01) |
| *B60L 1/00* | (2006.01) |
| *B60L 11/18* | (2006.01) |
| *H01M 10/625* | (2014.01) |
| *H01M 10/6556* | (2014.01) |
| *H01M 10/6567* | (2014.01) |
| *B60H 1/00* | (2006.01) |

(52) U.S. Cl.
CPC .............. *H01M 10/613* (2015.04); *B60L 1/003* (2013.01); *B60L 11/1874* (2013.01); *G05D 23/1934* (2013.01); *H01M 10/625* (2015.04); *H01M 10/6556* (2015.04); *H01M 10/6567* (2015.04); *B60H 1/00278* (2013.01); *Y02T 10/7005* (2013.01); *Y02T 10/705* (2013.01)

(58) Field of Classification Search
CPC ........... B60H 1/00271; B60H 1/00278; B60H 1/00307; B60H 1/00885; B60K 11/02; B60K 2001/003; B60K 2001/005; B60K 2001/006; B60L 11/1874; H01M 10/625
USPC ...................................................... 62/243, 244
See application file for complete search history.

(56) References Cited

U.S. PATENT DOCUMENTS

| | | | | |
|---|---|---|---|---|
| 5,624,003 A * | 4/1997 | Matsuki | ............. | B60H 1/00278 180/65.1 |
| 6,942,938 B2 * | 9/2005 | Derflinger | ......... | H01M 8/04029 180/165 |
| 7,451,808 B2 * | 11/2008 | Busse | ................ | B60H 1/00278 165/202 |

* cited by examiner

*Primary Examiner* — Jonathan Bradford

(57) ABSTRACT

A thermostatic assembly for power members of an electric vehicle includes a pipe set having a main pipe and a recycle pipe, one end of the main pipe connected to one side of the pump, a plurality of temperature-adjusting pipes connected between another end of the main pipe and one end of the recycle pipe, another end of the recycle pipe connected to another side of the pump, a plurality of power members respectively set on the temperature-adjusting pipes, a input change valve set between the main pipe and each temperature-adjusting pipe, a output change valve set between the recycle pipe and each temperature-adjusting pipe, a controller electrically connected to the input change valve, the output change valve and each power member. Under this arrangement, the controller ranks a sequence of the temperature information and defines a sequence of the flow direction of the temperature-adjusting water.

10 Claims, 7 Drawing Sheets

THERMOSTATIC ASSEMBLY FOR POWER MEMBERS OF AN ELECTRIC VEHICLE AND THE OPERATING PROCESS THEREOF

BACKGROUND OF THE INVENTION

1. Field of the Invention

The present invention relates to a thermostatic assembly, and more particularly to a thermostatic assembly for power members of an electric vehicle and the operating process thereof.

2. Description of Related Art

Nowadays, with the popularity of vehicles, the geographic distance of the world is substantially shortened. However, such transportation improvement apparently accompanies the deterioration of air pollution because of the waste air from the vehicle. Therefore, an electric vehicle comes to the world.

The electric vehicle comprises a plurality of power members (such as battery and motor...etc.) which is used to convert an electric energy into a kinetic energy of the electric vehicle. The electric vehicle further comprises a conventional cooling assembly. The conventional cooling assembly is used to conduct the heat from the power members to the outside of the electric vehicle. The conventional cooling assembly has a pump, a cooling member, a cooling pipe and a recycle pipe. One end of the cooling pipe is connected to the pump. Another end of the cooling pipe connects to the power members in series connection and further connects to one end of the recycle pipe. Another end of the recycle pipe is connected to the pump. The cooling member is set on the recycle pipe between the cooling pipe and the pump. Under this arrangement, the pump transports a certain capacity of cooling water to the power members via the cooling pipe; then, the cooling water absorbs the heat from the power members for cooling down the power members; thereafter, the cooling water is transported to the cooling member via the recycle pipe, and the cooling member conducts the heat from the cooling water to the outside of the electric vehicle; finally, the cooling water is transported to the pump via the recycle pipe so that the pump would transport the cooling water toward the power members via the cooling pipe again. Therefore, the conventional cooling assembly cools down the power members so as to prevent the power members from overheating. However, the conventional cooling assembly still has one disadvantage as following:

After the cooling water absorbs the heat from the beginning power members, the temperature of the cooling water might be raised with the temperature of the beginning power members so that the cooling water is not cooling the rest power members as well as the beginning power members.

The present invention has arisen to mitigate and/or obviate the disadvantages of the conventional.

SUMMARY OF THE INVENTION

The main objective of the present invention is to provide an improved thermostatic assembly.

To achieve the objective, a thermostatic assembly for power members of an electric vehicle comprises a pipe set having a main pipe and a recycle pipe, one end of the main pipe connected to one side of the pump, a plurality of temperature-adjusting pipes connected between another end of the main pipe and one end of the recycle pipe, another end of the recycle pipe connected to another side of the pump to form as a closed-circuit, a plurality of power members respectively set on the temperature-adjusting pipes, an input change valve being set between the main pipe and each temperature-adjusting pipe, a output change valve being set between the recycle pipe and each temperature-adjusting pipe, a controller electrically connected to the input change valve, the output change valve and each power member for detecting the temperature of each power member. Wherein, the controller has a monitoring unit and a plurality of detecting units; the monitoring unit is electrically connected to the detecting units, the input change valve and the output change valve; the detecting units are further respectively connected to the power members for detecting the temperature of each power member and sending a detecting information to the monitoring unit; the monitoring unit ranks the sequence of the temperature information and defines the sequence of the flow direction of the temperature-adjusting water according to the temperature of each power member; a first flow control valve is set on each temperature-adjusting pipe at one side of the respective power member; a second flow control valve is set on each temperature-adjusting pipe at another side of the respective power member; a heat exchanger and a fan member are both set on the recycle pipe; the fan member is corresponding to the heat exchanger; the fan member further blows the heat exchanger for cooling the heat exchanger; a connecting pipe is connected between the recycle pipe and a tank; a thermostatic pipe is connected to the tank; if the temperature of the temperature-adjusting water which flows toward the pump is higher than a normal value, the temperature-adjusting water is transported into the tank, and then the thermostatic pipe reduces the temperature of the temperature-adjusting water before the temperature-adjusting water flows to the pump; in contrast, if the temperature of the temperature-adjusting water which flows toward the pump is lower than the normal value, the temperature-adjusting water is transported into the tank, and then the thermostatic pipe raises the temperature of the temperature-adjusting water before the temperature-adjusting water flows from the tank to the pump.

Under this arrangement, the controller ranks a sequence of the temperature information and defines a sequence of the flow direction of the temperature-adjusting water according to the temperature of each power member for adjusting the temperature of each power member; then, when the temperature-adjusting water flows into one temperature-adjusting pipe, the temperature of the respective power member is adjusted by the temperature-adjusting water.

The operating process of the thermostatic assembly of the present invention comprises the following steps:

First, defining an upper limit and a lower limit of the temperature of each power member; about the first step, the user inputs an upper limit data and a lower limit data of the temperature of each power member into the controller; second, detecting the temperature of each power member; about the second step, the detecting unit of the controller detects the temperature of the power member and the condition of the temperature of the power member; third, defining a sequence of the flow direction of the temperature-adjusting water; about the third step, the controller ranks the priority to cool or heat the power members according to the second step and defines the sequence of the flow direction of the temperature-adjusting water according to the temperature of each power member; and fourth, defining a temperature-adjusting mode; about the fourth step, the controller defines a temperature-adjusting mode according to the temperature of each power member, the condition of the temperature of the power member and the sequence of the flow direction of the temperature-adjusting water. Wherein, the controller calculates the flow rate of the temperature-adjusting water flowing toward the power member; the controller controls the first flow control valve and the second flow control valve to adjust the flow rate of the temperature-adjusting water flowing toward the power member; the detecting unit keeps detecting the temperature of the respective power member and sending the detecting information to the monitoring unit; the controller ranks the priority to cool or heat the power members and defines the sequence of the flow direction of the temperature-adjusting water according to the temperature of each power member.

Under this arrangement, after the temperature-adjusting water absorbs the heat from the partial power members, the temperature of the temperature-adjusting water would not be raised as the temperature of the rest power members, because the controller defines a temperature-adjusting mode according to the temperature of each power member, the condition of the temperature of the power member and the sequence of the flow direction of the temperature-adjusting water.

Further benefits and advantages of the present invention will become apparent after a careful reading of the detailed description with appropriate reference to the accompanying drawings.

DETAILED DESCRIPTION OF THE INVENTION

Figure 1:
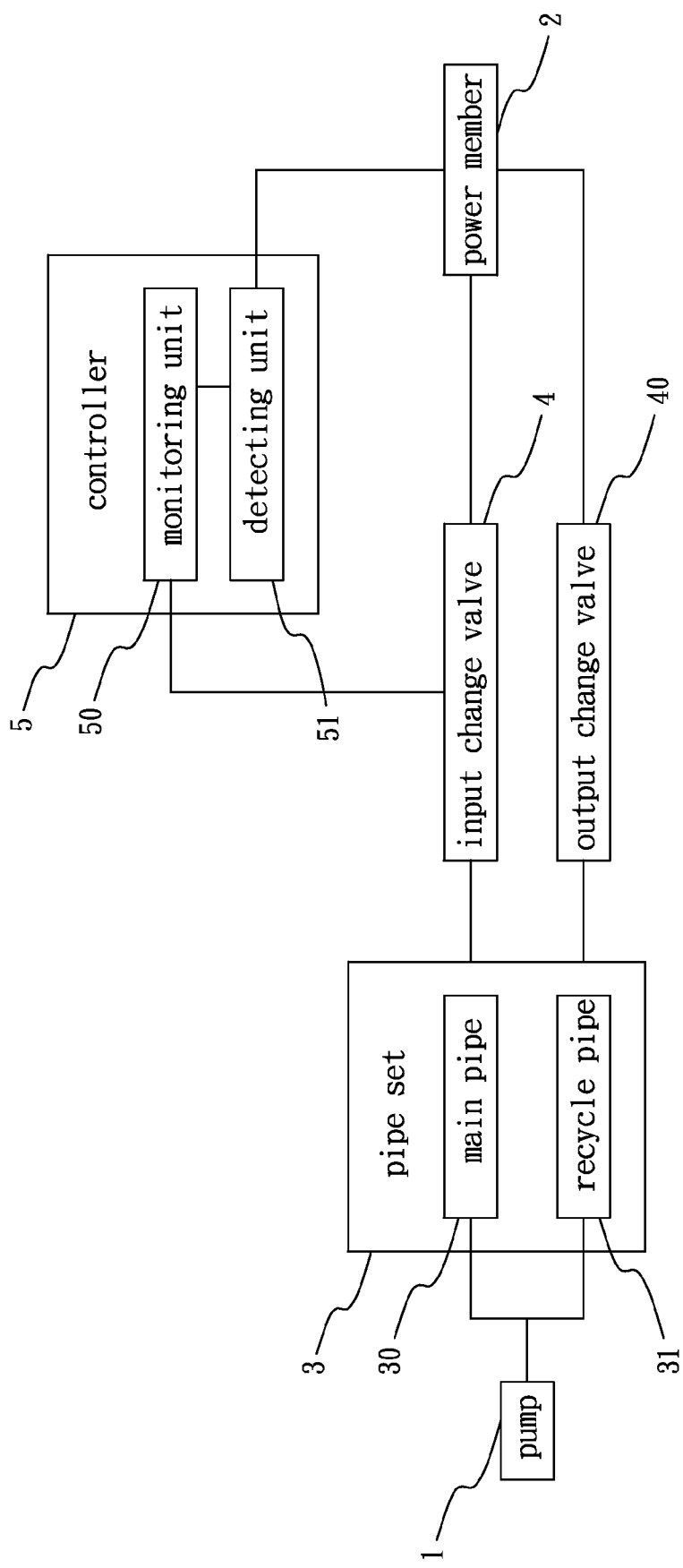
FIG. 1 is a block chart for showing the connection between a pump, a pipe set, a plurality of power members, an input change valve, an output change valve and a controller.
Figure 2:
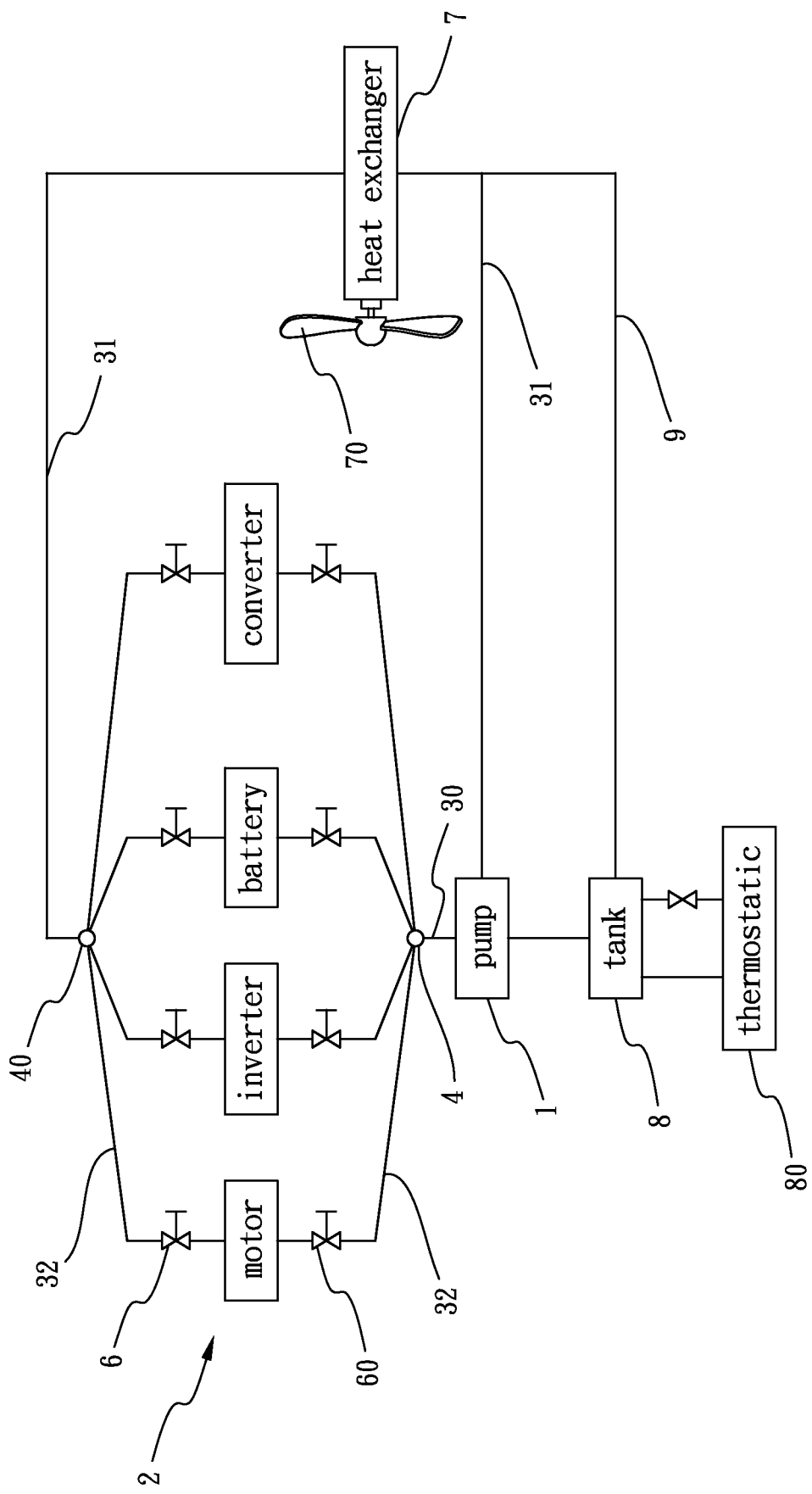
FIG. 2 is a block chart for showing a layout of the pump, the pipe set, the power members, the input change valve and the output change valve.

Referring to FIGS. 1-2, a thermostatic assembly for power members of an electric vehicle in accordance with the present invention comprises a pump 1, a plurality of power members 2 (the power members 2 are respectively a motor, an inverter, a battery and a converter in the priority embodiment of the present invention. In addition, each power member 2 substantially is one of a subsystem of the electric vehicle and the type of the subsystem is not limited by the present invention; i.e. the subsystem might be a plurality of shifting members or electric members . . . etc.), a pipe set 3, at least one input change valve 4, at least one output change valve 40 and a controller 5. The pipe set 3 has a main pipe 30 and a recycle pipe 31. Referring to FIG. 2, one end of the main pipe 30 is connected to one side of the pump 1. The pump 1 is used to propel a certain volume of temperature-adjusting water toward the power members 2 via the main pipe 30. A plurality of temperature-adjusting pipes 32 is connected between another end of the main pipe 30 and one end of the recycle pipe 31 (i.e. in parallel connection). Another end of the recycle pipe 31 is connected to another side of the pump 1 to form as a closed-circuit (as shown in FIG. 2). The power members 2 are respectively set on the temperature-adjusting pipes 32 so that when the temperature-adjusting water flows into one temperature-adjusting pipe 32, the temperature of the respective power member 2 is adjusted by the temperature-adjusting water. The input change valve 4 is set between the main pipe 30 and each temperature-adjusting pipe 32. The input change valve 4 is used to define a flow direction of the temperature-adjusting water in the main pipe 30 or in one of the temperature-adjusting pipes 32 when the temperature-adjusting water flows toward the input change valve 4. Thus, when the temperature-adjusting water is in the main pipe 30 and flows toward the input change valve 4, the temperature-adjusting water is selectively transported into the selected temperature-adjusting pipe 32; when the temperature-adjusting water is in one temperature-adjusting pipe 32 and flows toward the input change valve 4, the temperature-adjusting water is selectively transported into the selected temperature-adjusting pipe 32. The output change valve 40 is set between the recycle pipe 31 and each temperature-adjusting pipe 32. The output change valve 40 is used to define a flow direction of the temperature-adjusting water in one of the temperature-adjusting pipes 32 when the temperature-adjusting water flows toward the output change valve 40. Thus, when the temperature-adjusting water is in one of the temperature-adjusting pipes 32 and flows toward the output change valve 40, the temperature-adjusting water is selectively transported into the selected temperature-adjusting pipe 32 or is transported into the recycle pipe 31 directly to flow toward the pump 1. The controller 5 has a monitoring unit 50 and a plurality of detecting units 51. The monitoring unit 50 is electrically connected to the detecting units 51, the input change valve 4 and the output change valve 40. The detecting units 51 are further respectively connected to the power members 2 for detecting the temperature of each power member 2.

Under this arrangement, the controller 5 adjusting the temperature of each power members 2 by the suitable temperature-adjusting water is based on the following steps:

1. Each detecting unit 51 detects the temperature of the respective power member 2 and sends detecting information to the monitoring unit 50.

2. The monitoring unit 50 ranks a sequence of the temperature information and defines a sequence of the flow direction of the temperature-adjusting water according to the temperature of each power member 2. Hereinafter, the sequence of the temperature information for the power members 2 from high to low is assumed as: first, the motor; second, the inverter; third, the battery; fourth, the converter. Thus, the sequence of the flow direction of the temperature-adjusting water is assumed as that the temperature-adjusting water is transported to the motor at first; then, the temperature-adjusting water is transported to the inverter from the motor; thereafter, the temperature-adjusting water is transported to the battery from the inverter; finally, the temperature-adjusting water is transported to the converter from the battery (the sequence of the temperature information and the sequence of the flow direction of the temperature-adjusting water depend on the actual situation, the assumption here is not limited by the present invention.).

3. The monitoring unit 50 controls the input change valve 4 to make the temperature-adjusting water flow toward the motor of the power members 2 from the main pipe 30 for adjusting the temperature of the motor of the power members 2.

4. The monitoring unit 50 controls the output change valve 40 to make the temperature-adjusting water flow toward the inverter of the power members 2 from the motor of the power members 2 for adjusting the temperature of the inverter of the power members 2.

5. The monitoring unit 50 controls the input change valve 4 to let the temperature-adjusting water flow toward the battery of the power members 2 from the inverter of the power members 2 for adjusting the temperature of the battery of the power members 2.

6. The monitoring unit 50 controls the output change valve 40 to make the temperature-adjusting water flow toward the converter of the power members 2 from the battery of the power members 2 for adjusting the temperature of the converter of the power members 2.

7. The monitoring unit 50 controls the input change valve 4 to make the temperature-adjusting water flow toward the output change valve 40.

8. The monitoring unit 50 controls the output change valve 40 to make the temperature-adjusting water flow into the recycle pipe 31 to the pump 1.

Furthermore, a first flow control valve 6 is set on each temperature-adjusting pipe 32 at one side of the respective power member 2. A second flow control valve 60 is set on each temperature-adjusting pipe 32 at another side of the respective power member 2. The first flow control valve 6 and the second flow control valve 60 are both used to adjust the flow rate of the temperature-adjusting water which is flowed toward the respective power member 2 or is flowed away from the respective power member 2. A heat exchanger 7 and a fan member 70 are both set on the recycle pipe 31. The fan member 70 is corresponding to the heat exchanger 7. When the temperature-adjusting water from the power members 2 flows to the heat exchanger 7, the heat exchanger 7 absorbs the heat of the temperature-adjusting water for cooling the temperature-adjusting water, and the fan member 70 further blows the heat exchanger 7 for cooling the heat exchanger 7. A connecting pipe 9 is connected between the recycle pipe 31 and a tank 8. A thermostatic pipe 80 is connected to the tank 8. If the temperature of the temperature-adjusting water which flows toward the pump 1 is higher than a normal value, the temperature-adjusting water is transported into the tank 8, and then the thermostatic pipe 80 reduces the temperature of the temperature-adjusting water before the temperature-adjusting water flows to the pump 1; in contrast, if the temperature of the temperature-adjusting water which flows toward the pump 1 is lower than the normal value, the temperature-adjusting water is transported into the tank 8, and then the thermostatic pipe 80 raises the temperature of the temperature-adjusting water before the temperature-adjusting water flows from the tank 8 to the pump 1.

Figure 3:
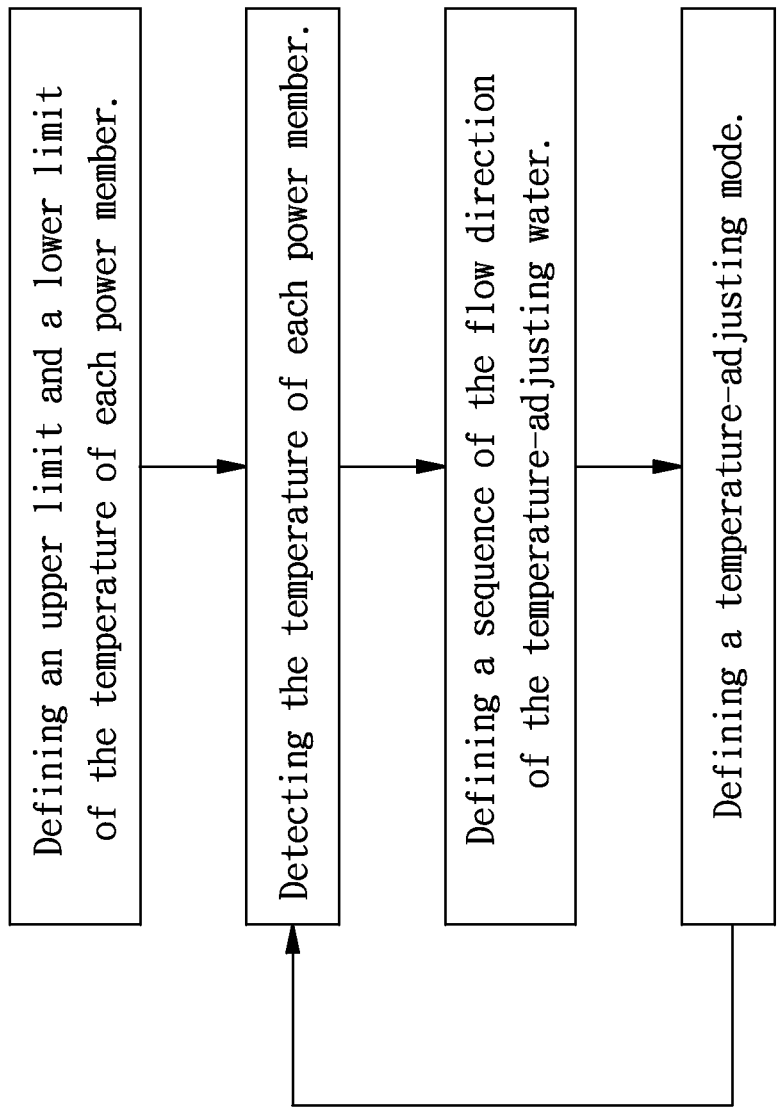
FIG. 3 is a flow chart for showing an operating process of the thermostatic assembly for power members of an electric vehicle of the present invention.

Referring to FIG. 3, the operating process of the thermostatic assembly for power members of an electric vehicle of the present invention comprises the following steps:

First, defining an upper limit and a lower limit of the temperature of each power member 2;

Second, detecting the temperature of each power member 2;

Third, defining a sequence of the flow direction of the temperature-adjusting water; and Fourth, defining a temperature-adjusting mode.

Figure 5:
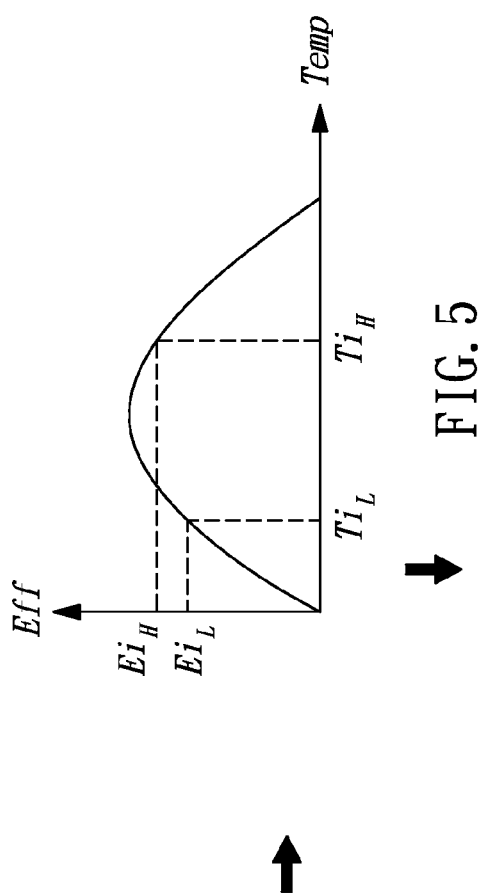
FIG. 5 is a graph for showing the upper limit and the lower limit of the temperature of the power member.
Figure 6:
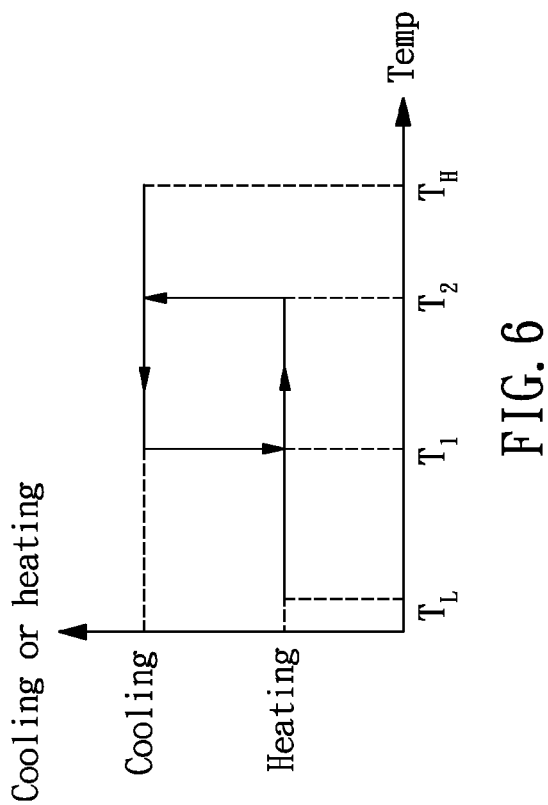
FIG. 6 is a graph for showing a starting data (T1) and a stopping data (T2) of the temperature of the power member.
Figure 4:
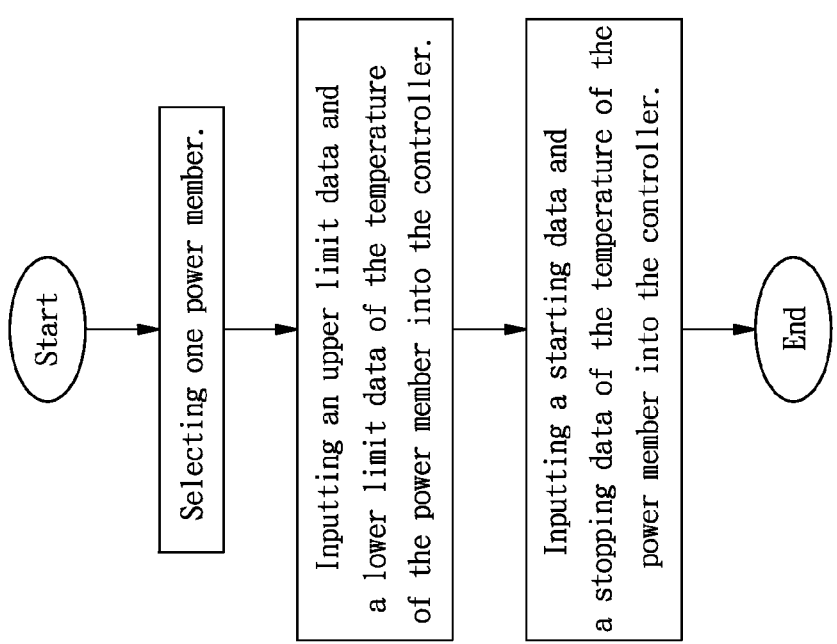
FIG. 4 is a flow chart for showing how to define an upper limit and a lower limit of the temperature of each power member.

About the first step, referring to FIGS. 4-6, the user inputs an upper limit data and a lower limit data of the temperature of each power member 2 into the controller 5 according to a sub-process. The sub-process is further described as following.

1. Selecting one power member 2 (such as the motor, the inverter, the battery or the converter), in which the temperature of the power member 2 is needed to be adjusted;

2. Inputting an upper limit data and a lower limit data of the temperature of the power member 2 into the controller 5 according to FIG. 5 which is a graph for showing the relationship between a efficiency and the temperature of the power member 2 (as shown in FIG. 5; the upper limit and the lower limit of the temperature of the power member 2 are respectively shown as TiH and TiL in FIG. 5; the upper limit and the lower limit of the efficiency of the power member 2 are respectively shown as EiH and EiL in FIG. 5); and 3. Inputting a starting data and a stopping data of the temperature of the power member 2 (the starting data and the stopping data of the temperature of the power member 2 are respectively shown as T2 and T1 in FIG. 6) into the controller 5 according to FIG. 6 which is a thermal circle graph for showing the relationship between whether cooling the power member 2 or not, and the temperature of the power member 2 (as shown in FIG. 6, when the power member 2 is over heated by the temperature-adjusting water and the temperature of the power member 2 is over T2, the thermostatic assembly switches to cool the power member 2; in contrast, when the power member 2 is over cooled by the temperature-adjusting water and the temperature of the power member 2 is underneath T1, the thermostatic assembly switches to heat the power member 2; in addition, when the temperature of the power member 2 is between T1 and T2, the thermostatic assembly keeps heating or cooling the power member 2.).

About the second step to detect the temperature of each power member 2:

The detecting unit 51 of the controller 5 detects the temperature of the power member 2 and the condition of the temperature of the power member 2 (such as the temperature of the power member 2 is raised or reduced by the thermostatic assembly).

About the third step to define a sequence of the flow direction of the temperature-adjusting water:

The controller 5 ranks the priority to cool or heat the power members 2 according to the second step and defines the sequence of the flow direction of the temperature-adjusting water according to the temperature of each power member 2.

About the fourth step to define a temperature-adjusting mode:

The controller 5 defines a temperature-adjusting mode (such as a mode for raising the temperature of the power member 2, a mode for reducing the temperature of the power member 2 or a mode for maintaining the present mode) according to the temperature of each power member 2, the condition of the temperature of the power member 2 and the sequence of the flow direction of the temperature-adjusting water.

Figure 7:
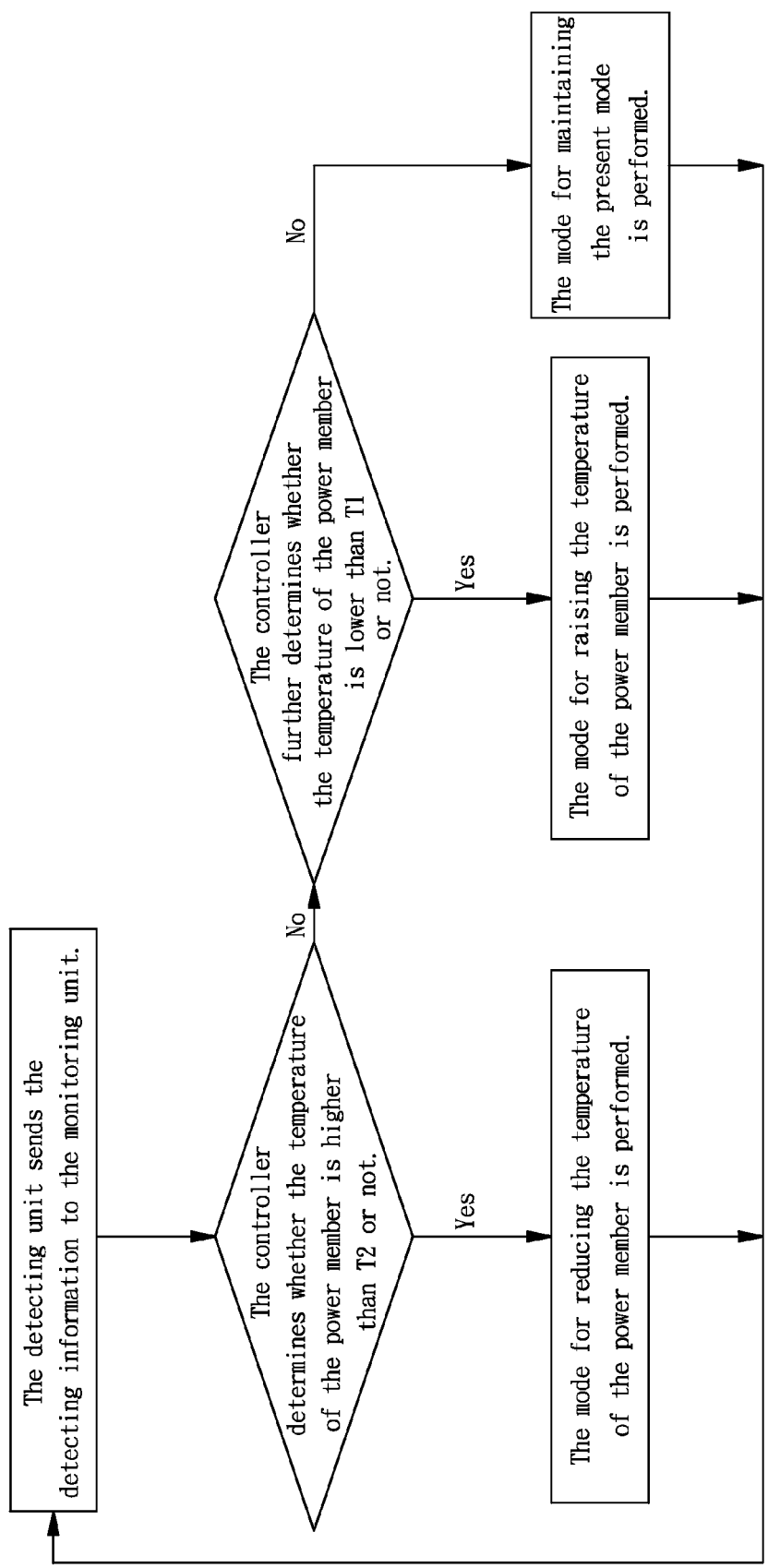
FIG. 7 is a flow chart for showing how to define a temperature-adjusting mode.

Referring to FIG. 7, how to define a temperature-adjusting mode is shown as FIG. 7. The detecting unit 51 sends the detecting information (such as the temperature of each power member 2, the condition of the temperature of the power member 2 . . . etc.) to the monitoring unit 50. The controller 5 determines whether the temperature of the power member 2 is higher than T2 or not. If the temperature of the power member 2 is higher than T2, the mode for reducing the temperature of the power member 2 is performed, and the detecting unit 51 keeps detecting the temperature of the respective power member 2 and sending the detecting information to the monitoring unit 50. If the temperature of the power member 2 is lower than T2, the controller 5 further determines whether the temperature of the power member 2 is lower than T1 or not. If the temperature of the power member 2 is lower than T1, the mode for raising the temperature of the power member 2 is performed, and the detecting unit 51 keeps detecting the temperature of the respective power member 2 and sending the detecting information to the monitoring unit 50. If the temperature of the power member 2 is between T1 and T2, the mode for maintaining the present mode is performed, and the detecting unit 51 keeps detecting the temperature of the respective power member 2 and sending the detecting information to the monitoring unit 50.

Figure 8:
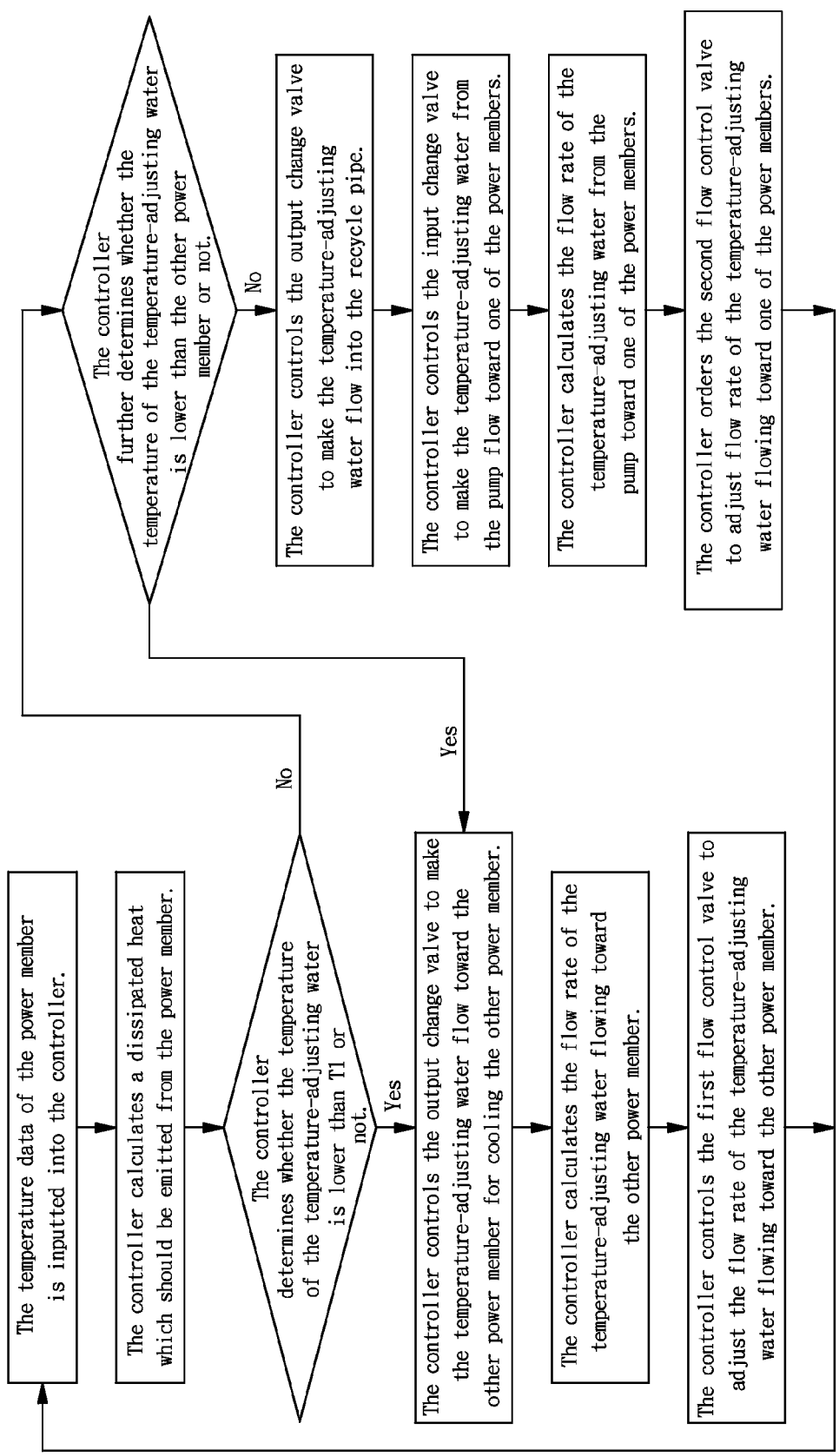
FIG. 8 is a flow chart for showing how to define a sequence of the flow direction of the temperature-adjusting water when the temperature of the power member is reduced by the temperature-adjusting water.

When the power members 2 are cooled by the temperature-adjusting water, how to define the sequence of the flow direction of the temperature-adjusting water is shown as FIG. 8. The temperature data of the power member 2 is inputted into the controller 5 and the controller 5 calculates a dissipated heat which should be emitted from the power member 2. Then, the controller 5 determines whether the temperature of the temperature-adjusting water is lower than T1 or not. If the temperature of the temperature-adjusting water is lower than T1, the controller 5 controls the output change valve 40 to make the temperature-adjusting water flow toward the other power member 2 for cooling the other power member 2; and then, the controller 5 calculates the flow rate of the temperature-adjusting water flowing toward the other power member 2; thereafter, the controller 5 controls the first flow control valve 6 to adjust the flow rate of the temperature-adjusting water flowing toward the other power member 2; finally, the temperature data of the power member 2 keeps inputting into the controller 5 and the controller 5 keeps calculating a dissipated heat from the power member 2. In contrast, if the temperature of the temperature-adjusting water is higher than T1, the controller 5 further determines whether the temperature of the temperature-adjusting water is lower than the other power member 2 or not. If the temperature of the temperature-adjusting water is lower than the rest power member 2, the controller 5 controls the output change valve 40 to make the temperature-adjusting water flow toward the rest power member 2 for cooling the rest power member 2; and then, the controller 5 calculates the flow rate of the temperature-adjusting water flowing toward the rest power member 2; thereafter, the controller 5 controls the first flow control valve 6 to adjust the flow rate of the temperature-adjusting water flowing toward the rest power member 2; finally, the temperature data of the power member 2 keeps inputting into the controller 5 and the controller 5 keeps calculating a dissipated heat from the power member 2. If the temperature of the temperature-adjusting water is higher than the rest power member 2, the controller controls the output change valve 40 to make the temperature-adjusting water flow into the recycle pipe 31; then, the controller 5 controls the input change valve 4 to make the temperature-adjusting water from the pump 1 flow toward one of the power members 5; thereafter, the controller 5 calculates the flow rate of the temperature-adjusting water from the pump 1 toward one of the power members 2, and the controller 5 orders the second flow control valve 60 to adjust flow rate of the temperature-adjusting water flowing toward one of the power members 2; finally, the temperature data of the power member 2 keeps inputting into the controller 5 and the controller 5 keeps calculating a dissipated heat from the power member 2.

Figure 9:
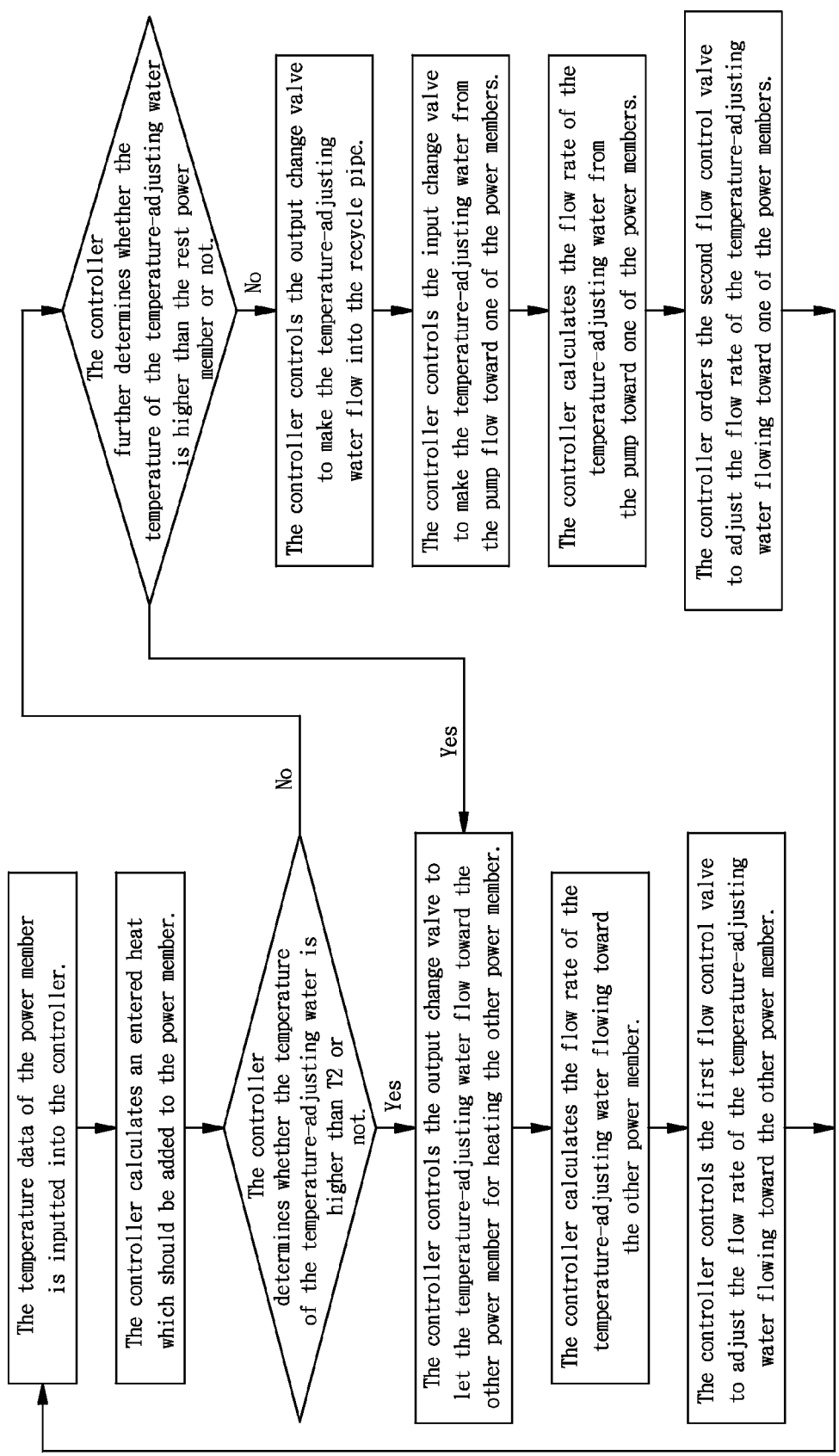
FIG. 9 is a flow chart for showing how to define the sequence of the flow direction of the temperature-adjusting water when the temperature of the power member is raised by the temperature-adjusting water.

When the power members 2 are heated by the temperature-adjusting water, how to define the sequence of the flow direction of the temperature-adjusting water is shown as FIG. 9. The temperature data of the power member 2 is inputted into the controller 5 and the controller 5 calculates an entered heat which should be added to the power member 2. Then, the controller 5 determines whether the temperature of the temperature-adjusting water is higher than T2 or not. If the temperature of the temperature-adjusting water is higher than T2, the controller 5 controls the output change valve 40 to let the temperature-adjusting water flow toward the other power member 2 for heating the other power member 2; and then, the controller 5 calculates the flow rate of the temperature-adjusting water flowing toward the other power member 2; thereafter, the controller 5 controls the first flow control valve 6 to adjust the flow rate of the temperature-adjusting water flowing toward the other power member 2; finally, the temperature data of the power member 2 keeps inputting into the controller 5 and the controller 5 keeps calculating the entered heat to the power member 2. In contrast, if the temperature of the temperature-adjusting water is lower than T2, the controller 5 further determines whether the temperature of the temperature-adjusting water is higher than the rest power member 2 or not. If the temperature-adjusting water is higher than the rest power member 2, the controller 5 controls the output change valve 40 to make the temperature-adjusting water flow toward the rest power member 2 for heating the rest power member 2; and then, the controller 5 calculates the flow rate of the temperature-adjusting water flowing toward the rest power member 2; thereafter, the controller 5 controls the first flow control valve 6 to adjust the flow rate of the temperature-adjusting water flowing toward the rest power member 2; finally, the temperature data of the power member 2 keeps inputting into the controller 5 and the controller 5 keeps calculating a entered heat to the power member 2. If the temperature-adjusting water is lower than the rest power member 2, the controller 5 controls the output change valve 40 to make the temperature-adjusting water flow into the recycle pipe 31; then, the controller 5 controls the input change valve 4 to make the temperature-adjusting water from the pump 1 flow toward one of the power members 5; thereafter, the controller 5 calculates the flow rate of the temperature-adjusting water from the pump 1 toward one of the power members 2, and the controller 5 orders the second flow control valve 60 to adjust the flow rate of the temperature-adjusting water flowing toward one of the power members 2; finally, the temperature data of the power member 2 keeps inputting into the controller 5 and the controller 5 keeps calculating a entered heat to the power member 2.

All in all, after the temperature-adjusting water absorbs the heat from the partial power members 2, the temperature of the temperature-adjusting water would not be raised as the temperature of the rest power members 2 as the prior art, because of the controller 5, input change valve 4 and the output change valve 40 of the present invention.

Although the invention has been explained in relation to its preferred embodiment, it is to be understood that many other possible modifications and variations can be made without departing from the spirit and scope of the invention as hereinafter claimed.

What is claimed is:
1. A thermostatic assembly for power members of an electric vehicle comprising:
   a pipe set having a main pipe and a recycle pipe, one end of the main pipe connected to one side of a pump, a plurality of temperature-adjusting pipes connected between another end of the main pipe and one end of the recycle pipe, another end of the recycle pipe connected to another side of the pump to form a closed-circuit wherein, a plurality of power members are respectively set on the temperature-adjusting pipes;

an input change valve being set between the main pipe and each temperature-adjusting pipe, an output change valve being set between the recycle pipe and each temperature-adjusting pipe; and a controller electrically connected to the input change valve, the output change valve and each power member for detecting the temperature of each power member;

wherein the controller ranks a sequence of detected temperature and defines a sequence of a flow direction of temperature-adjusting water according to the temperature of each power member for adjusting the temperature of each power member;

then, when the temperature-adjusting water flows into one temperature-adjusting pipe, the temperature of the respective power member is adjusted by the temperature-adjusting water.

2. The thermostatic assembly for power members of an electric vehicle as claimed in claim 1, wherein the controller has a monitoring unit and a plurality of detecting units; the monitoring unit is electrically connected to the detecting units, the input change valve and the output change valve; the detecting units are further respectively connected to the power members for detecting the temperature of each power member and sending a detecting information to the monitoring unit; and the monitoring unit ranks the sequence of the temperature information and defines the sequence of the flow direction of the temperature-adjusting water according to the temperature of each power member.

3. The thermostatic assembly for power members of an electric vehicle as claimed in claim 1, wherein a first flow control valve is set on each temperature-adjusting pipe at one side of the respective power member; and a second flow control valve is set on each temperature-adjusting pipe at another side of the respective power member.

4. The thermostatic assembly for power members of an electric vehicle as claimed in claim 1, wherein a heat exchanger and a fan member are both set on the recycle pipe; the fan member is associated with the heat exchanger; and the fan member further blows the heat exchanger for cooling the heat exchanger.

5. The thermostatic assembly for power members of an electric vehicle as claimed in claim 1, wherein a connecting pipe is connected between the recycle pipe and a tank.

6. The thermostatic assembly for power members of an electric vehicle as claimed in claim 5, wherein a thermostatic pipe is connected to the tank; if the temperature of the temperature-adjusting water which flows toward the pump is higher than a normal value, the temperature-adjusting water is transported into the tank, and then the thermostatic pipe reduces the temperature of the temperature-adjusting water before the temperature-adjusting water flows to the pump; in contrast, if the temperature of the temperature-adjusting water which flows toward the pump is lower than the normal value, the temperature-adjusting water is transported into the tank, and then the thermostatic pipe raises the temperature of the temperature-adjusting water before the temperature-adjusting water flows from the tank to the pump.

7. The thermostatic assembly for power members of an electric vehicle as claimed in claim 1, wherein the controller is further configured to perform an operating process comprising the following steps:

First, defining an upper limit and a lower limit of the temperature of each power member; wherein a user inputs an upper limit data and a lower limit data of the temperature of each power member into the controller;

second, detecting the temperature of each power member; wherein the detecting unit of the controller detects the temperature of the power member and the condition of the temperature of the power member;

third, defining a sequence of the flow direction of the temperature-adjusting water; wherein the controller ranks the priority to cool or heat the power members according to the second step and defines the sequence of the flow direction of the temperature-adjusting water according to the temperature of each power member; and fourth, defining a temperature-adjusting mode; wherein the controller defines a temperature-adjusting mode according to the temperature of each power member, the condition of the temperature of the power member and the sequence of the flow direction of the temperature-adjusting water.

8. The thermostatic assembly for power members of an electric vehicle as claimed in claim 7, wherein the controller calculates a flow rate of the temperature-adjusting water flowing toward the members; the controller controls the first flow control valve and the second flow control valve to adjust the flow rate of the temperature-adjusting water flowing toward the power member.

9. The thermostatic assembly for power members of an electric vehicle as claimed in claim 7, wherein the detecting unit keeps detecting the temperature of the each power member and sending the detecting information to the monitoring unit.

10. The thermostatic assembly for power members of an electric vehicle as claimed in claim 7, wherein the controller ranks the priority to cool or heat the power members and defines the sequence of the flow direction of the temperature-adjusting water according to the temperature of each power member.

* * * * *